United States Patent

Driscoll et al.

[11] 3,966,692
[45] June 29, 1976

[54] PROCESS FOR HALOGENATING RUBBER

[75] Inventors: Richard E. Driscoll; Hugh E. Milligan, both of Monroe, La.

[73] Assignee: Cities Service Company, Tulsa, Okla.

[22] Filed: June 10, 1974

[21] Appl. No.: 477,726

[52] U.S. Cl. .............................. 526/20; 526/43; 526/339

[51] Int. Cl.² .......................................... C08F 8/22

[58] Field of Search ............... 260/85.3 H, 94.7 HA, 260/96 HA

[56] References Cited
UNITED STATES PATENTS 2,631,984  3/1953  Crawford et al. ............. 260/85.3 H
2,964,489  12/1960  Baldwin et al. ............... 260/85.3 H Primary Examiner—Paul R. Michl
Attorney, Agent, or Firm—Elton F. Gunn

[57] ABSTRACT

A process for halogenating rubber wherein a fluid halogen is dissolved in a flowing stream of the rubber dissolved in an organic solvent. The flow of the stream is maintained at a Reynold's number below 100 while maintaining a pressure which assures complete dissolving of the halogen while also preventing vaporization of volatile constituents in the stream during reaction of the halogen with the rubber.

10 Claims, 1 Drawing Figure

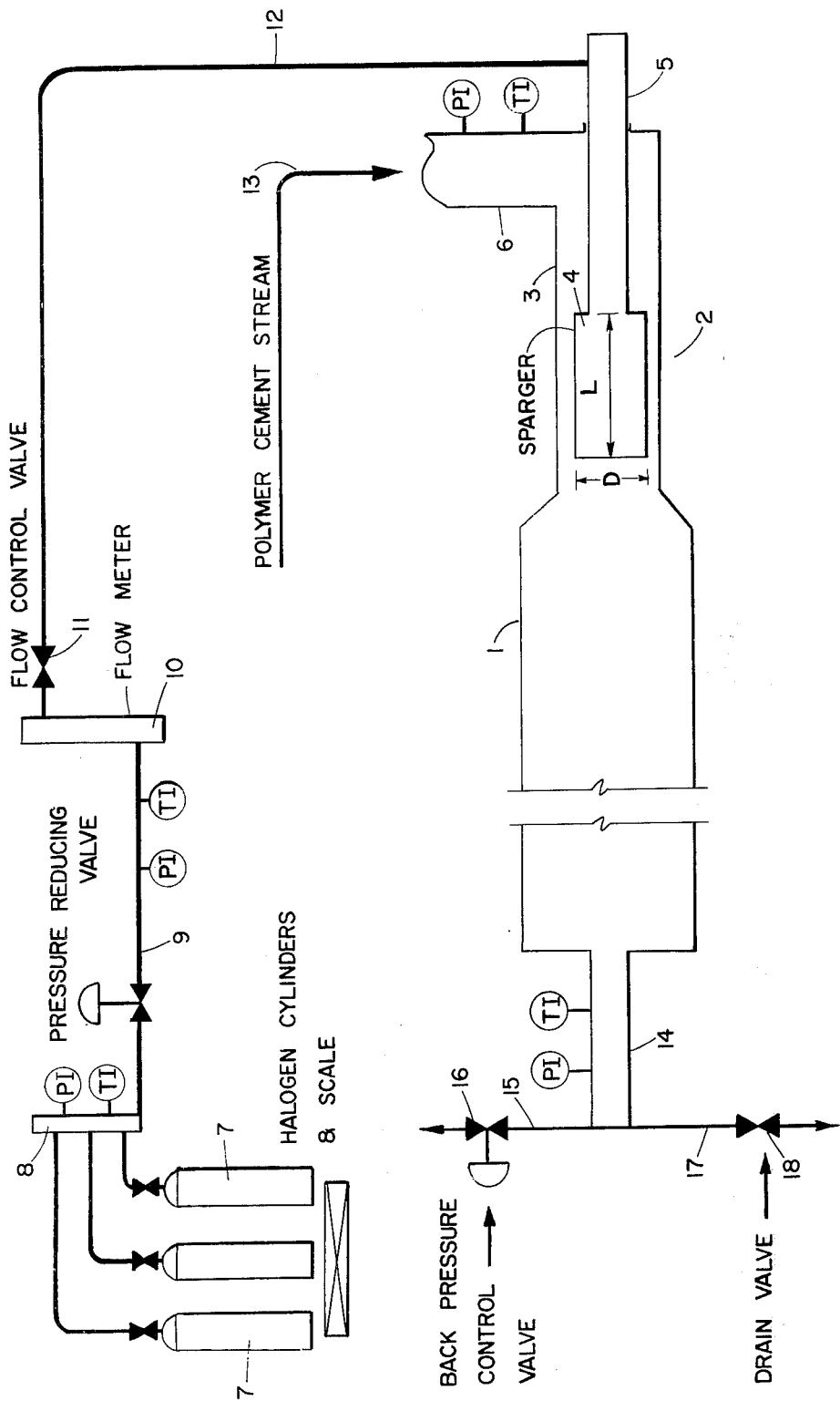

PROCESS FOR HALOGENATING RUBBER

BACKGROUND OF THE INVENTION

The present invention pertains to halogenated elastomers and more particularly pertains to methods for halogenating rubbers while dissolved in an organic solvent.

Present methods and techniques for mixing and distributing gaseous halogens into high viscosity rubber solutions for halogenation of the rubber are generally on the batch basis and involve use of high energy input devices such as turbine mixers and fully baffled vessels. The mixing vessels are frequently glass lined kettles which are massive, expensive and equipped with elaborate hydraulic drive units. The procedure employed with such gas-liquid mixers is to add high viscosity rubber solution, begin agitation, and proceed with injection of the gaseous halogen over a prolonged period of time. Since the process is essentially a batch operation, much of the reaction occurs in such a manner that the concentration of the halogenated rubber being produced in the solvent is subject to variation, and this has an adverse affect on the quality of the product produced. In addition, it is difficult to duplicate process conditions for halogenating the rubber from one batch to the next.

It is therefore an object of the present invention to provide a process for halogenating elastomers whereby an elastomer can be halogenated continuously at uniform process conditions.

Another object of the present invention is to provide a process for halogenating elastomers while dissolved in an organic solvent without resort to extensive mechanical agitation of the rubber solutions.

Other objects and advantages of the present invention will become apparent from the following description and the appended claims.

SUMMARY OF THE INVENTION

The present invention is an improvement in processes of the general type wherein an elastomer is halogenated by incorporating a halogen into a solution of the elastomer dissolved in an organic solvent, with reaction of the halogen and the elastomer while both are dissolved in the solvent. In accordance with the present teaching, the halogen is introduced into a stream of the dissolved elastomer so that both the mixing and the reacting of the halogen with the elastomer takes place within the flowing stream while maintaining a Reynold's number therein of below 100. In addition, a pressure is maintained on the stream which assures substantially complete dissolution of the halogen therein while preventing vaporization of volatile constituents in the stream during reaction of the halogen with the rubber.

BRIEF DESCRIPTION OF THE DRAWING

The drawing is a process diagram which includes representations of apparatus which can be used in the practice of the invention when using a normally gaseous halogen such as chlorine.

DESCRIPTION OF PREFERRED EMBODIMENTS

Referring to the drawing, a chlorination reaction tube is represented at 1. A mixer for the chlorine and a rubber solution is generally represented at 2 and comprises a tubular section 3 which interconnects with reaction vessel 1, a sparger 4, which connects with a conduit 5 for feeding chlorine, and an inlet 6 for introducing a rubber solution into the mixer. Chlorine under pressure is contained within the cylinders 7, and passes from a manifold 8 through line 9 to a flow meter 10. By means of flow control valve 11 and the flow meter, chlorine is fed at a constant rate through line 12 to conduit 5 on the mixer. At the same time, a rubber solution is fed through line 13 to inlet 6 on the mixer by means of a metering pump which is not shown. Upon completion of the chlorination reaction in tube 1, the chlorinated rubber, still dissolved in the organic solvent, is conveyed out of the vessel through outlet 14 and thence into line 15 which leads into a holding tank or wash tank wherein the rubber solution is water washed and/or neutralized for removal of hydrogen chloride. Line 15 contains a back pressure valve 16 for regulating the pressure upstream, especially in the chlorination vessel 1 and mixer 2. Line 17 which contains valve 18 is also provided as means for draining and flushing the mixer 2 and reaction vessel 1. To advantage, the reaction tube 1, mixer tube 2 and feed conduit 5 can be made of glass tubing, and with the sparger 4 being made of fritted glass or corrosion resistant metal.

When a normally liquid halogen such as bromine or bromine monochloride is used as the halogenating agent instead of a normally gaseous halogen such as chlorine, the liquid halogen can be kept in any suitable vessel while using an interconnected metering pump as a substitute for flow meter 10 and flow control valve 11. In addition, one or more Static Mixer (Kenics Corp.) liquid-liquid mixers can be employed in place of sparger 10 to assure good mixing of the liquid halogen with the rubber solution in the absence of moving parts and without development of excessive back pressure. Such liquid-liquid mixers consist of alternate-hand helical elements juxtaposed at 90° to one another inside a tubular housing. Additional details of such mixers can be found in Section 19, pgs. 22 and 24 of "Chemical Engineers' Handbook", 5th Edition (1973). By using two of these mixers in series, mixing of the liquid halogen and the elastomer solution can be facilitated. More specifically, the liquid halogen and organic solvent can be fed to the first mixer to form a liquid mixture which is then passed into a second mixer into which the elastomer solution is also fed and wherein the two liquid streams are mixed for thorough dispersion of the liquid bromine in the elastomer solution. This technique of first mixing the liquid halogen with solvent prior to mixing with the elastomer solution has been found especially advantageous in quickly and thoroughly dispersing the halogen in the elastomer solution.

While the present invention can be used with any halogen reactive elastomer which can be dispersed in a relatively inert organic solvent, it can be used to particular advantage when brominating or chlorinating butyl rubber. Hexane is a suitable solvent for butyl rubber, but still other solvents can be employed including other normally liquid paraffinic hydrocarbons or chlorinated hydrocarbons. For convenience and without intending to limit the invention, further description will frequently be with reference to chlorination or bromination of butyl rubber which has been dissolved in hexane.

It is preferable that the solution of butyl rubber in hexane have a viscosity within the range of about 2000 – 4000 centipoise when fed to the mixer 2. Such viscosities can generally be achieved when the concentration of dissolved butyl rubber in hexane is on the order of 20 weight percent, but is dependent to some extent on the Mooney viscosity of the rubber, i.e. the resultant viscosity of the solution in any given solvent is directly related to the Mooney viscosity of the rubber that is dissolved.

As previously indicated, it is essential to the invention that the Reynold's number (Re) of the flowing stream of rubber solution and dissolved halogen should not exceed 100 when flowing through the mixer tube 3 and the reaction tube 1 where:

$$\text{Reynold's number } (Re) = \frac{(D)(G)}{(M)}$$

and $(D)$ is tube diameter in feet, $(G)$ is mass velocity through the tube in (pounds/hr.) × (Square feet of tube area), and $(M)$ is viscosity at the flowing temperature in lbs./ft. hr.

It is also essential to the present invention that the flowing stream of rubber solution during mixing and reaction of the halogen be maintained at a pressure which not only assures substantially complete dissolving of the halogen in the rubber solution but also prevents vaporization of volatile constituents of the solution, such as the organic solvent, the halogen or hydrogen halide during reaction of the halogen with the rubber.

More specifically, the pressure in mixer tube 3 and reaction tube 1 should be sufficient to assure that halogen gas or liquid that is introduced into mixer tube 3 is very quickly dissolved or dispersed and remains thus during transit of the rubber solution through reaction tube 1. At the same time, the pressure should also be high enough to prevent vaporization of organic solvent, halogen or hydrogen halide in mixing tube 3 or reactor tube 1. More than enough pressure for this purpose can be made available from halogen supply line 12 and rubber solution supply line 13, and back pressure control valve 16 can be used as a throttling valve to hold the pressure necessary to prevent such vaporization. When the mixer and the reaction tube are made of glass, vaporization makes itself visibly evident in the form of bubbles, and the pressure can be regulated to prevent their formation.

When halogenating butyl rubber with chlorine, bromine or bromine monochloride, only slight or moderate pressures are required to prevent vaporization of volatile constituents in the dissolved rubber stream even at mixing and reaction temperatures above about 60°F., more specifically at temperatures above about 60°F. and up to about 100°F. In such cases, and when the solvent is hexane, the pressure on the flowing steam of dissolved rubber can be maintained at about 2 psig to about 30 psig to prevent vaporization. Pressures within the range of about 10 psig to about 30 psig can be used with temperatures of about 60°F. to about 100°F. for chlorine, whereas lower pressures, i.e. about 2 psig to about 10 psig can be used for normally liquid halogens.

The purpose of maintaining the halogen and the organic solvent in the liquid phase while maintaining Reynold's numbers below 100 when dissolving and reacting the chlorine is to provide uniform plug flow of the constituents through the mixer and reactor tubes since less efficient mixing and reaction of the halogen has been observed when gas bubbles and greater turbulence exist within the dissolved rubber stream. Therefore, the halogenation of elastomers in accordance with the present method can be accomplished continuously, and also more efficiently and economically in comparison to methods wherein the rubber solution and halogen are subjected to intense agitation at pressures which permit vaporization and hence poorer contacting of the halogen with the rubber.

The amount of halogen introduced into the rubber solution for reaction with the rubber is subject to variation depending on the types of rubber and halogen employed. When halogenating butyl rubber with chlorine, bromine or bromine monochloride, up to about 4 weight percent of these halogens can be dissolved in the rubber solution, based upon the weight of rubber in the solution.

The reaction time required to obtain substantially complete reaction of the halogen with the elastomer will depend upon temperature, pressure and types and amounts of the halogen and elastomer employed. In any event the length of reaction tube 1 can be made sufficiently long to provide the necessary contact time.

To advantage, the rubber solution can be substantially free of water when dissolving and reacting the halogen therein. More specifically, the water content of the cement can be maintained at or below about 1–2 weight percent, although somewhat higher water contents can be tolerated.

Upon leaving reaction tube 1 via outlet 14, the halogenated rubber is still in solution and hydrogen chlorides or bromide is also present as a reaction product, i.e. hydrogen is released from the rubber upon reaction with the halogen and the released hydrogen reacts with some of the halogen to form hydrogen halide. In addition, there is some lowering of the molecular weight of the rubber as a result of the halogenation, and this reflects itself by a lowering of the viscosity of the rubber solution. The viscosity of a butyl rubber solution in hexane can thus experience a lowering of viscosity from 2000 – 4000 centipoise to about 1000 – 1500 centipoise. The halogenated rubber product must then be treated further to remove hydrogen halide and also to vaporize and release the solvent. In accordance with known methods, the hydrogen halide can be reacted with alkali metal hydroxides or ammonia to form salts which are water soluble and can be separated from the rubber solution. Alternatively, the rubber solution can be washed with water for removal of the hydrogen halide in accordance with the process described in copending application Ser. No. 356,696 filed May 2, 1973, and assigned to the same assignee as this application. Although various known methods can be used for removal of the organic solvent from the halogenated rubber, there is advantage in vaporizing and separating the solvent by passing the rubber solution into an agitated hot water bath, followed by separation of the rubber from the bath and subsequent drying to remove the last traces of moisture.

EXAMPLE 1

Reaction of chlorine with butyl rubber dissolved in hexane (20 weight percent rubber) was carried out by means of apparatus substantially as shown in the drawing. Mixer tube 3 was a glass tube having an inside diameter of 1 inch and a length of 18 inches. Reaction tube 1 was a glass tube having an inside diameter of 4 inches and a length of 120 inches. The sparger 4 was made of fritted glass with 100 micron openings, and had a diameter of 0.75 inch and a length of 1.82 inches. It is preferable that fritted spargers used with gaseous chlorine have a diameter, $d$, which is between 50% and 80% the diameter of mixer tube 3 and an operative length, $l$, which is 50% to 200% of the diameter of the mixing tube.

The rubber solution, at a temperature of 90°–93°F. was fed into the mixing and reacting tubes at a rate of 1,560 gallons per hour (312 pounds of butyl rubber per hour). Chlorine at a temperature of 80°F. was fed into the mixer at the rate of 5.8 lbs. per hour. The pressure within the reactor tube was maintained at 20 psig. The temperature at the outlet of reactor tube was 93°–98°F. During the operation little or no gas phase was visible in the 4 inch reaction tube. Essentially all of the chlorine dissolved in the rubber solution shortly after leaving the sparger.

Reynold's numbers in various sections of the mixer-reactor were determined to be as follows:

| | |
|---|---|
| Across full diameter of mixing tubes | = 3.90 |
| In annulus between inner wall of mixer tube and sparger | = 5.95 |
| In 4 inch diameter reactor tube | = 1.0 |

Chlorinated butyl rubber in hexane and containing hydrogen halide was passed into a glass lined holding tank until 3000 pounds of the rubber solution had been chlorinated. When the mixer and reactor tubes were depressurized upon cessation of the halogenation process, it was noticed that residual solution in the reactor tube "boiled" due to evolution of dissolved chlorine and HCl.

The chlorinated butyl rubber was then mixed with water and thoroughly washed to remove HCl. Thereafter, the solution was mixed with boiling water for vaporization and separation of the hexane from the rubber. Following this procedure the washed and desolvented rubber was dried to a moisture content of less than 2 weight percent.

EXAMPLE II

Using the same reaction tube as in Example I, liquid bromine was fed into one end of a Static Mixer at the rate of 13.3 lbs./hr. while hexane was fed into the same end of this mixer at the rate of 130 lbs./hr. The resulting mixture of bromine and hexane was fed into one end of a second Static Mixer while feeding a 15 weight percent solution of butyl rubber in hexane into the same end of this second mixer at the rate of 2,060 lbs./hr. (309 pounds of butyl rubber per hour). Effluent from this second mixer was discharged directly into the reaction tube. The temperature of the mixture flowing through the reaction tube was observed to be 68°F. at the inlet and 84°F. at the outlet, with a pressure of 4 psig being maintained within the tube. The resulting brominated rubber was then washed and desolventized as in Example I. Analysis of the rubber revealed a bromine content of 1.8 weight percent.

EXAMPLE III

Example II was repeated except that bromine monochloride was used as the halogenating agent, being mixed with hexane in the first mixer at the rate of 14.1 lbs./hr. while feeding the 15 weight percent solution of butyl rubber to the second mixer at the rate of 2,143 lbs./hr. (321 pounds of butyl rubber per hour). The temperature of the mixture flowing through the reaction tube was 76°F. at the inlet and 81°F. at the outlet while maintaining a pressure of 2 psig. The resulting halogenated rubber was washed and desolventized as in Example II.

While the present invention has been described with reference to particular materials, conditions, apparatus and the like, it will nonetheless be understood that even other embodiments which are within the spirit and the scope of the invention defined in the following claims.

What is claimed is:

1. In a process for halogenating an elastomer wherein a halogen is incorporated into a solution of the elastomer in an organic solvent and reaction of the halogen with the elastomer occurs while both are dissolved in the solvent, the improvement which comprises mixing a fluid halogen with a continuously flowing stream of the elastomer solution and followed by reaction of said halogen with the elastomer of said stream, the Reynold's number of said stream being below 100 during mixing of the halogen and the reaction thereof with the dissolved elastomer in the stream, and wherein a pressure is maintained on said stream which assures substantially complete disolution of the halogen therein during mixing and reaction while also preventing vaporization of volatile components of said stream during reaction of the halogen with the rubber.

2. A process as defined in claim 1 wherein the elastomer is butyl rubber and the halogen is selected from the group consisting of chlorine, bromine, or bromine monochloride.

3. A process as defined in claim 2 wherein the stream of elastomer solution is at a temperature above about 60°F. during dissolving of the halogen and the reaction thereof with the rubber.

4. A process as in claim 3 wherein the temperature of the solution is at a temperature above about 60°F. and up to about 100°F.

5. A process as in claim 2 wherein the organic solvent is hexane and the stream of elastomer solution is maintained at a temperature of above about 60°F. and up to about 100°F. during dissolving of the halogen and the reaction thereof with the rubber while a pressure within the range of about 10 psig to about 30 psig is maintained on said stream.

6. A process as in claim 2 wherein said temperature is within the range of about 80°F. to about 100°F. while said pressure is within the range of about 20 to about 30 psig.

7. The process as defined in claim 2 wherein the amount of halogen dissolved in the rubber solution is up to about 4 weight percent based upon the weight of the elastomer dissolved in said solution.

8. A process as defined in claim 2 wherein the viscosity of the rubber solution prior to dissolving the halogen therein is within the range of about 1500 to about 6000 centipoise.

9. A process as defined in claim 2 wherein the viscosity of the rubber solution following halogenation is within the range of about 1000 to about 1500 centipoise.

10. A process as defined in claim 2 wherein the rubber solution contains no more than about 2% by weight of water when dissolving and reacting the halogen therein.

* * * * *